Figure 1:
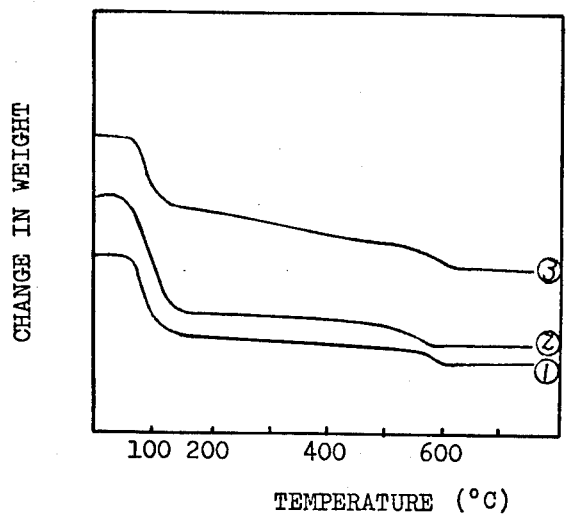

United States Patent [19]

Murata et al.

[11] 4,061,583

[45] Dec. 6, 1977

[54] PREPARATION OF TITANATES

[75] Inventors: Michihiro Murata; Akihiro Kitao, both of Nagaokakyo, Japan

[73] Assignee: Murata Manufacturing Co., Ltd., Japan

[21] Appl. No.: 680,538

[22] Filed: Apr. 26, 1976

Related U.S. Application Data

[63] Continuation-in-part of Ser. No. 490,264, July 29, 1974, abandoned.

[30] Foreign Application Priority Data

Mar. 13, 1974 Japan .................................. 49-29321
May 24, 1974 Japan .................................. 49-59198

[51] Int. Cl.$^2$ ....................... C01G 23/00; C01F 11/00
[52] U.S. Cl. ......................... 252/62.3 BT; 252/63.5; 252/62.9; 252/520; 252/521; 423/263; 423/598
[58] Field of Search .............................. 423/598, 263; 252/62.3 BT, 62.9, 63.5, 520, 521

[56] References Cited

U.S. PATENT DOCUMENTS

| 3,549,315 | 12/1970 | Lester et al. ......................... 423/598 |
| 3,637,531 | 1/1972 | Faxon et al. ......................... 423/598 |

FOREIGN PATENT DOCUMENTS

| 740,799 | 8/1966 | Canada .................................. 423/598 |
| 159,809 | 9/1962 | U.S.S.R. .............................. 423/598 |

*Primary Examiner*—Herbert T. Carter
*Attorney, Agent, or Firm*—Birch, Stewart, Kolasch and Birch

[57] ABSTRACT

A process for the preparation of a titanate which comprises adding an aqueous solution containing ions of titanium and at least one metal selected from the group consisting of Ba, Ca, Sr, Zn, Cd and Pb to an aqueous alkaline solution containing hydrogen peroxide, recovering the resulting precipitate and heating the precipitate at a temperature not lower than 100° C to give the titanate of the metal as used in uniformly fine particles. The resulting titanate can be used as ceramic materials for electronic elements.

10 Claims, 5 Drawing Figures

PREPARATION OF TITANATES

This is a continuation-in-part application of Ser. No. 490,264, filed July 29, 1974, now abandoned.

The present invention relates to a process for the preparation of titanates useful as ceramic materials for electronic elements such as dielectric ceramics, piezoelectric ceramics, resistive ceramics and semiconductor ceramics by the use of the liquid phase reaction.

The expression "titanates" as used herein denotes barium titanate, calcium titanate, strontium titanate, lead titanate, zinc titanate, cadmium titanate and their modified titanates. The expression "modified titanates" denotes the one fundamentally consisting of at least one of the above titanates but a part of the metal or titanium component therein is replaced by at least one of any other metal such as Al, Sn, Sb, Ta, Mn, Fe, Y, Nb, Zr and rare earth elements of atomic numbers 57 to 71. These can be employed as ceramic materials for various electronic elements according to their respective electrical properties.

In preparation of electronic elements in general, it is necessary to employ a raw material which conforms to requirements such as, for example, purity and particle size.

Hitherto, titanates have been prepared by a method accompanying the solid phase reaction. However, titanates produced by this method have such disadvantages that they are not of sufficient purity and the particle size thereof is relatively large (e.g. greater than 1 $\mu$) and not uniform. On the other hand, titanates have been prepared by a method accompanying the liquid phase reaction when the particle size of the titanates has great influence on the properties of the electronic elements in practical use. For example, barium titanate has been prepared by a method which comprises precipitating barium titanyl oxalate from a solution containing titanium ion and barium ion and decomposing said barium titanyl oxalate at a temperature not lower than about 700° C. However, decomposition of the oxalate at such elevated temperature may cause the growth of the particles. For this reason, it is almost impossible to produce titanates having a fine and uniform particle size less than about 0.5 $\mu$. If the decomposition is carried out at a temperature as low as possible for producing fine and uniform titanates, it is quite difficult to obtain pure titanates since CO and $CO_2$ remain in the product.

Various methods have been proposed for the preparation of metal titanates including the use of hydrogen peroxide, for example, in USSR Pat. No. 159,809 and Canadian Pat. No. 740,799. In the method of the above USSR patent, titanium tetrachloride is mixed with hydrogen peroxide, and cooled to 10° to 15° C, and to the resulting mixture are added ammonia and a solution of nitrate or chloride of the corresponding metal whereby a precipitate of the peroxide compound of titanium and said metal is obtained. The precipitate is filtered off, washed, dried, and calcined at 800° C. However, this method has such a serious disadvantage that the molar ratio of metal to titanium in the product varies greatly from the preadjusted value since the precipitate-forming reaction is attended with the local decrease of the pH value and a coprecipitation phenomenon in the portions where titanium and metal ions are locally in excess. The method disclosed in the Canadian patent as mentioned above comprises heating an aqueous solution of strontium nitrate and titanyl nitrate to form a precipitate of titanic acid, adding hydrogen peroxide to the solution containing said precipitate of titanic acid, and then adding sodium hydroxide to the resulting mixture to precipitate strontium peroxide ($SrO_2$), and sintering the precipitate of titanic acid and strontium peroxide to form strontium titanate ($SrTiO_3$). In this method, the precipitation of strontium peroxide is incompletely effected after that of titanic acid, so that the molar ratio of strontium to titanium in the product varies greatly from the preadjusted value and the formation of titanium dioxide occurs simultaneously with the fomation of strontium titanate. It is therefore difficult with the conventional methods including the use of hydrogen peroxide to produce a metal titanate containing the metal and titanium in the preadjusted molar ratio. If the molar ratio of metal to titanium cannot be brought to the range of 1.000 ± 0.04, it is impossible to use a composition of metal titanate as ceramic materials for electronic elements.

It is therefore an object of the present invention to provide a new process for the preparation of titanates of high purity in uniformly fine particles. Another object of this invention is to provide a process for the preparation of titanates capable of being used as ceramic materials for electronic elements. A further object of this invention is to provide a process for the preparation of a metal titanate containing metal and titanium in the preadjusted molar ratio. These and other objects of this invention will be further apparent from the following description.

According to the present invention, there is provided a process for the preparation of titanate which comprises adding an aqueous solution containing ions of titanium and at least one metal selected from the group consisting of Ba, Ca, Sr, Zn, Cd and Pb to an aqueous alkaline solution containing hydrogen peroxide, recovering a precipitate from the resulting mixture, and decomposing said precipitate by heating.

In the above process, titanium ion is combined with the metal ion in the same proportion of atoms as in the mixture by the mediation of hydrogen peroxide whereby forming a complex peroxide. The complex peroxide can be decomposed with ease by heating at a temperature not lower than 100° C and not higher than the decomposing temperature of the resulting titanate. Upon heating, the hydrogen peroxide present in the complex peroxide is destroyed and eliminated completely therefrom in the form of $H_2O$ at the temperature in the said range. If the complex peroxide is heated at a temperature not higher than 600° C, there is obtained the corresponding amorphous titanate being free from impurities and having a fine and uniform particle size (about 0.1 $\mu$ or less), which is readily adaptable for the preparation of electronic elements such as dielectrics. If the complex peroxide is heated at a temperature higher than 600° C, there may be prepared the corresponding crystalline titanate. The crystalline titanate produced is also free from impurities and has such a particle size as to be uniformly fine (about 0.1 $\mu$ or less).

In order to prepare the aqueous solution containing ions of titanium and at least one metal selected from the group consisting of Ba, Ca, Sr, Zn, Cd and Pb, there may be used such titanium and metal salts as are soluble in water, for example, chlorides, nitrates, sulphates, acetates, etc.

As the aqueous alkaline solution, there may be used aqueous ammonia, an aqueous solution of sodium hydroxide, an aqueous solution of potassium hydroxide, etc.

In the preparation of titanates containing titanium and at least one metal selected from the said group in an approximately equimolar ratio, hydrogen peroxide is usually employed in an amount not less than 5 mols to 1 mol of the combined amount of titanium and said metal. For the preparation of lead titanate and its modified titanates, however, it is sufficient to use hydrogen peroxide in an amount not less than 1 mol to 1 mol of titanium. It is desired to adjust the mixture to not less than pH 7 and to keep its pH value constant as far as possible. It is, however, sufficient for the preparation of the precipitate corresponding to lead titanate or its modified titanates to adjust the pH value of the mixture to not less than 3.

It has been found that the molar ratio of metal to titanium in the product shows a large variation depending on the order of reaction. In order to prepare a metal titanate containing metal and titanium in the preadjusted molar ratio, an aqueous solution containing metal and titanium ions must be added to an aqueous alkaline solution containing hydrogen peroxide. It is, however, preferred to add an aqueous alkaline solution to the alkaline solution containing hydrogen peroxide simultaneously with the addition of the solution containing metal and titanium ions to keep the pH value constant during the reaction because the pH value in the resulting mixture has an influence upon the yield of complex peroxide. In order to prevent the hydrolysis of $Ti^{4+}$, it is also preferred to add hydrogen peroxide to the solution containing metal and titanium ions before adding the latter to the alkaline solution containing hydrogen peroxide. The prevention of hydrolysis makes it possible to keep $Ti^{4+}$ stable for a long time.

As shown in Examples 17 to 28 hereinafter described, small amounts of modifying agents may be added to the solutions prior to forming a precipitate in order to give certain desired characteristics in the final product. As the modifying agents, there may be used those such as Al, Sn, Sb, Ta, Mn, Fe, Y, Nb, Zr and rare earth elements of atomic numbers 57 to 71.

The invention will be further illustrated by the following examples.

EXAMPLE 1

Titanium tetrachloride (0.2 mol) and barium chloride (0.2 mol) are respectively dissolved in 1000 ml of distilled water. An aqueous solution containing ions of titanium and barium in an equimolar ratio is prepared by admixing 100 ml of the said titanium tetrachloride solution and 100 ml of the said barium chloride solution. A mixed solution (200 ml) is prepared by admixing 20 ml of 30% hydrogen peroxide solution, 15 ml of 28% aqueous ammonia and the rest of distilled water.

To the mixed solution is added dropwise the aqueous solution containing ions of titanium and barium in an equimolar ratio with stirring to precipitate a complex peroxide corresponding to barium titanate. The complex peroxide is recovered by filtering, washed thoroughly with distilled water, dehydrated with ethyl alcohol and then dried at room temperature. The complex peroxide is heated at 100° C. Amorphous barium titanate is obtained in high purity. A portion of the complex peroxide is submitted to a quantitative analysis. The molar ratio of titanium to barium is shown in Table 1.

EXAMPLES 2-6

The preparation of various titanates is illustrated by Examples 2 to 6, which are summarized in Table 1. The procedure of Example 1 is followed using starting materials in the molar ratio in this table.

Table 1

| Example No. | Starting material | | Molar ratio in the solution | | | pH | Molar ratio in complex peroxide | |
|---|---|---|---|---|---|---|---|---|
| | Ti ion | Me ion | Ti | Me | $H_2O_2$ | | Ti | Me |
| 1 | $TiCl_4$ | $BaCl_2$ | 1.00 | 1.00 | 12.00 | 9.2 | 1.00 | 1.00 |
| 2 | $TiCl_4$ | $SrCl_2$ | 1.00 | 1.00 | 12.00 | 9.2 | 1.00 | 0.99 |
| 3 | $TiCl_4$ | $CaCl_2$ | 1.00 | 1.00 | 12.00 | 9.2 | 1.00 | 0.98 |
| 4 | $Ti(NO_3)_4$ | $Pb(NO_3)_2$ | 1.00 | 1.00 | 12.00 | 9.1 | 1.00 | 1.00 |
| 5 | $TiCl_4$ | $ZnCl_2$ | 1.00 | 1.00 | 12.00 | 9.2 | 1.00 | 0.99 |
| 6 | $TiCl_4$ | $CdCl_2$ | 1.00 | 1.00 | 12.00 | 9.2 | 1.00 | 0.98 |

Figure 2:
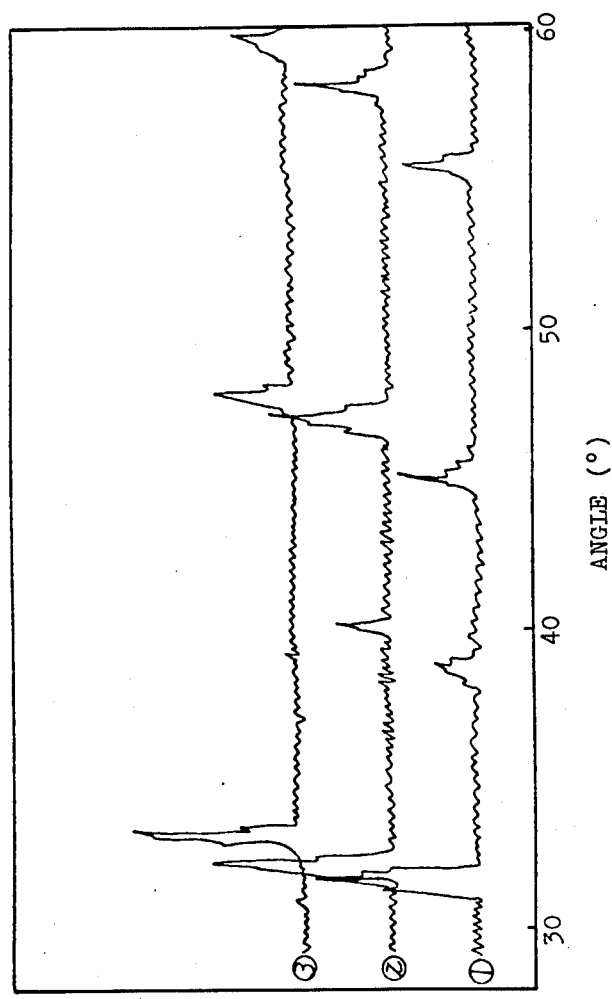

A certain amount of each complex peroxide is fed to a thermobalance thereby making a thermogravimetric analysis. FIG. 1 shows T.G.A. curves of the complex peroxide of Examples 1, 2 and 3. From this figure, it will be seen that the gravemetric change of the intermediate (i.e. complex peroxide) produced by the present process has been almost completed at 100° C and that the hydrogen peroxide in the intermediate is almost completely destroyed and eliminated therefrom as $H_2O$ at 100° C. An X-ray analysis showed that the product at 100° C gives no diffraction patterns and is amorphous titanate and that the product at 600° C gives diffraction patterns characteristic of the titanate crystal as shown in FIG. 2. In these figures, symbols 1, 2 and 3 correspond respectively to example numbers.

Figure 3:
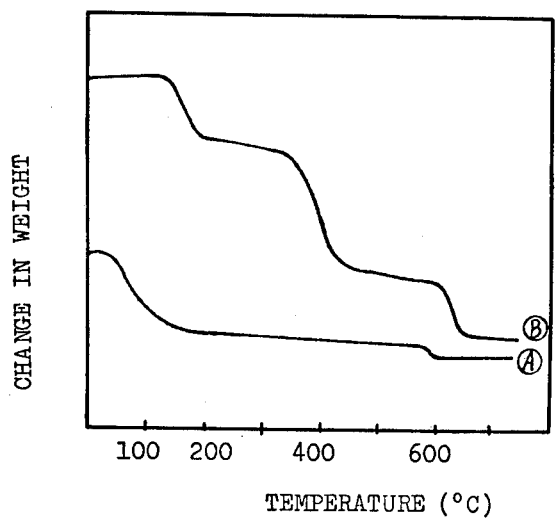

FIG. 3 shows a T.G.A. curve of the complex peroxide produced by Example 1 (cf. curve A) and that of barium titanyl oxalate produced by the conventional process (cf. curve B). From this figure, it is seen that the intermediate of the present process is easier to decompose by heating than the intermediate of the conventional process. That is, it is possible to produce barium titanate from the intermediate of the present process by heating even at a temperature of about 100° C but it is quite difficult to produce barium titanate from the intermediate of the conventional process by heating at a temperature lower than 700° C.

In the procedure described in Example 1, it is possible to prepare a titanate containing titanium and the metal in the predetermined molar ratio by adjusting their proportions in the mixture.

EXAMPLE 7

An aqueous solution (200 ml) containing ions of titanium and barium in an equimolar ratio is prepared in the same manner as Example 1. Dilute aqueous ammonia (200 ml) is prepared by adding distilled water to 13 ml of 28% aqueous ammonia. An aqueous alkaline solution (100 ml) containing hydrogen peroxide is also prepared by admixing 20 ml of 30% hydrogen peroxide solution, 2 ml of 28% aqueous ammonia and distilled water and then incorporating 1 g of ammonium chloride into the resulting solution.

To 100 ml of the aqueous alkaline solution containing hydrogen peroxide are simultaneously added dropwise 200 ml of the aqueous solution containing ions of titanium and barium in an equimolar amount and 200 ml of the dilute aqueous ammonia with stirring. Complex peroxide corresponding to barium titanate is precipitated in the resultant mixture of pH 9.2. The complex peroxide is recovered by filtering, washed thoroughly with distilled water, dehydrated with ethyl alcohol and then dried at room temperature. The complex peroxide is heated at 100° C. Amorphous barium titanate is obtained in high purity. Before heating, a portion of the complex peroxide is submitted to a quantitative analysis. Molar ratio of titanium to barium in the complex peroxide is shown in Table 2. A thermogravimetric analysis showed that the complex peroxide thus produced has the same T.G.A. curve as that of Example 1.

Figure 4:
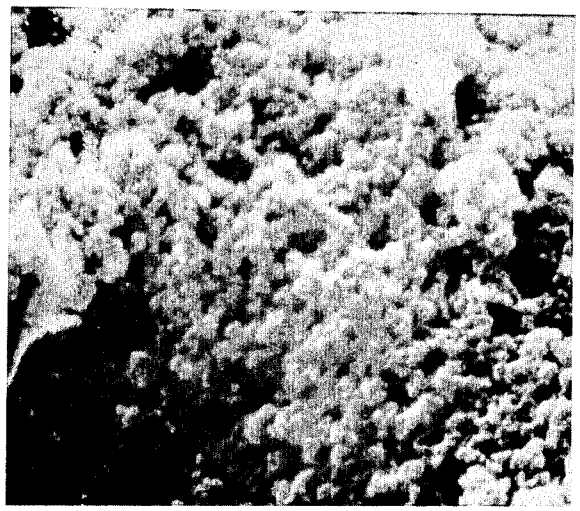
Figure 5:
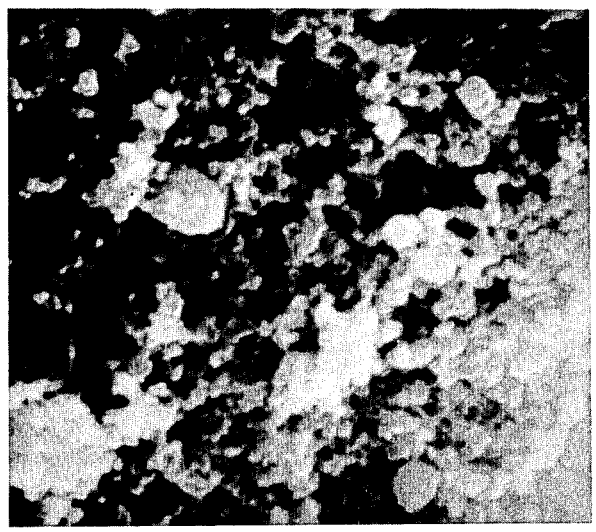

Both amorphous and crystalline titanates produced by the present process have uniformly fine particles as shown in FIG. 4 which is a micrograph of barium titanate produced from the complex peroxide of Example 7 by heating at 600° C, magnified 20,000 times by the electron microscope. FIG. 5 is a micrograph of conventional barium titanate produced from the barium titanyl oxalate by heating at 700° C, magnified 20,000 times. In FIGS. 4 and 5, a length of 1 cm on the micrographs is equal to 0.5 $\mu$ in the natural size. From these figures, it is seen that barium titanate produced by the present process has a smaller particle size than that produced by conventional processes.

EXAMPLES 8–16

The preparation of various titanates is illustrated by Examples 8 to 16, summarized in Table 2. The procedure of Example 7 is followed with specific variations shown in this table.

In the procedure described in Example 7, it is also possible to prepare titanates containing titanium and one or more metals in the predetermined molar ratio by adjusting their proportions in the mixture.

EXAMPLES 17–28

The preparation of barium titanate modified with various metals (X) is illustrated by Examples 17 to 28, summarized in Table 3. The procedure of Example 7 is followed using the proportions of modifying agents shown in this table. The molar ratios of the components in the complex peroxide are also shown in this table.

EXAMPLE 29

A solution containing titanium and metal ions is prepared by mixing 84.0 ml of 0.2 M titanium nitrate solution containing hydrogen peroxide (Ti/$H_2O_2$ ratio: 1.5), 116.0 ml of 0.2 M zirconium nitrate solution and 200.0 ml of 0.2 M lead nitrate solution. The solution containing titanium and metal ions is added dropwise with stirring to 400 ml of an aqueous alkaline solution containing 27.7 ml of ammonium hydroxide (28%), 3.9 ml of hydrogen peroxide (30%) and 3.9 g of ammonium nitrate, whereby a precipitate of complex peroxide is obtained. The precipitate is recovered by filtering, washed thoroughly with distilled water, dehydrated with ethyl alcohol, and dried at room temperature. The crystalline lead zirconate titanate, $Pb(Zr_{0.58}Ti_{0.42})O_3$, is obtained by heating the resulting precipitate at a temperature higher than 600° C.

EXAMPLE 30

An aqueous solution containing titanium and metal ions is prepared by mixing 200.0 ml of 0.2 M lead nitrate solution, 139.64 ml of 0.2 M zirconium nitrate solution, 19.80 ml of 0.2 M lanthanum nitrate solution, and 75.19 ml of 0.2 M titanium nitrate solution containing hydrogen peroxide (Ti/$H_2O_2$ ratio: 1.5). The solution containing titanium and metal ions is added dropwise with stirring to 400 ml of an aqueous alkaline solution containing 30.9 ml of ammonium hydroxide (28%), 3.9 ml of hydrogen peroxide (30%), and 3.9 g of ammonium nitrate, whereby a precipitate of complex peroxide is obtained. The precipitate is recovered by filtering, Table 2

| Example No. | Starting material | | Molar ratio in the admixed solution | | | | Molar ratio in the complex peroxide | |
|---|---|---|---|---|---|---|---|---|
| | Ti ion | Me ion | Ti | Me | $H_2O_2$ | pH | Ti | Me |
| 7 | $TiCl_4$ | $BaCl_2$ | 1.00 | 1.00 | 12.00 | 9.2 | 1.00 | 1.00 |
| 8 | $TiCl_4$ | $SrCl_2$ | 1.00 | 1.00 | 12.00 | 9.2 | 1.00 | 0.97 |
| 9 | $TiCl_4$ | $CaCl_2$ | 1.00 | 1.00 | 12.00 | 9.2 | 1.00 | 1.00 |
| 10 | $Ti(NO_3)_4$ | $Pb(NO_3)_2$ | 1.00 | 1.00 | 12.00 | 9.1 | 1.00 | 1.01 |
| 11 | $TiCl_4$ | $ZnCl_2$ | 1.00 | 1.00 | 12.00 | 9.2 | 1.00 | 0.99 |
| 12 | $TiCl_4$ | $CdCl_2$ | 1.00 | 1.00 | 12.00 | 9.2 | 1.00 | 0.98 |
| 13 | $TiCl_4$ | $BaCl_2$ $SrCl_2$ | 1.00 | 0.90 0.10 | 12.00 | 9.2 | 1.00 | 0.90 0.10 |
| 14 | $TiCl_4$ | $BaCl_2$ $SrCl_2$ | 1.00 | 0.99 0.01 | 12.00 | 9.2 | 1.00 | 0.99 0.01 |
| 15 | $TiCl_4$ | $BaCl_2$ $CaCl_2$ | 1.00 | 0.90 0.10 | 12.00 | 9.2 | 1.00 | 0.90 0.10 |
| 16 | $TiCl_4$ | $BaCl_2$ $CaCl_2$ | 1.00 | 0.99 0.01 | 12.00 | 9.2 | 1.00 | 0.99 0.01 |

Table 3

| Example No. | Starting Material | | | Molar ratio in the admixed solution | | | | | Molar ratio in the complex peroxide | | |
|---|---|---|---|---|---|---|---|---|---|---|---|
| | Ti ion | Me ion | X ion | Ti | Me | X | $H_2O_2$ | pH | Ti | Me | X |
| 17 | $TiCl_4$ | $BaCl_2$ | $YCl_3$ | 1.00 | 0.90 | 0.10 | 12 | 9.2 | 1.00 | 0.91 | 0.10 |
| 18 | $TiCl_4$ | $BaCl_2$ | $YCl_3$ | 1.00 | 0.99 | 0.01 | 12 | 9.2 | 1.00 | 1.00 | 0.01 |
| 19 | $TiCl_4$ | $BaCl_2$ | $DyCl_3$ | 1.00 | 0.90 | 0.10 | 12 | 9.2 | 1.00 | 0.91 | 0.10 |
| 20 | $TiCl_4$ | $BaCl_2$ | $DyCl_3$ | 1.00 | 0.99 | 0.01 | 12 | 9.2 | 1.00 | 0.99 | 0.01 |
| 21 | $TiCl_4$ | $BaCl_2$ | $AlCl_3$ | 1.00 | 0.90 | 0.10 | 12 | 9.2 | 1.00 | 0.91 | 0.10 |
| 22 | $TiCl_4$ | $BaCl_2$ | $ZrCl_4$ | 1.00 | 0.90 | 0.10 | 12 | 9.2 | 1.00 | 0.90 | 0.10 |
| 23 | $TiCl_4$ | $BaCl_2$ | $MnCl_2$ | 1.00 | 0.99 | 0.05 | 12 | 9.2 | 1.00 | 0.99 | 0.04 |
| 24 | $TiCl_4$ | $BaCl_2$ | $SnCl_4$ | 1.00 | 1.00 | 0.05 | 12 | 9.2 | 1.00 | 0.98 | 0.05 |
| 25 | $TiCl_4$ | $BaCl_2$ | $NbCl_5$ | 0.95 | 1.00 | 0.05 | 12 | 9.2 | 0.96 | 0.99 | 0.05 |
| 26 | $TiCl_4$ | $BaCl_2$ | $TaCl_5$ | 0.95 | 1.00 | 0.05 | 12 | 9.2 | 0.96 | 1.00 | 0.05 |
| 27 | $Ti(NO_3)_4$ | $Ba(NO_3)_2$ | $Sb(NO_3)_3$ | 0.95 | 1.00 | 0.05 | 12 | 9.2 | 0.96 | 1.00 | 0.04 |
| 28 | $TiCl_4$ | $BaCl_2$ | $FeCl_3$ | 1.00 | 1.00 | 0.01 | 12 | 9.2 | 1.00 | 1.00 | 0.01 | washed thoroughly with distilled water, dehydrated with ethyl alcohol, and dried at room temperature. The resulting precipitate is heated at a temperature higher than 600° C, whereby crystalline lead lanthanum zirconate titanate, $Pb_{0.91}La_{0.09}(Zr_{0.65}Ti_{0.35})_{0.9775}O_3$, is obtained.

What is claimed is:

1. A process for the preparation of a titanate which comprises the steps of
    a. dissolving a titanium salt and at least one metal salt selected from the group consisting of salts of Ba, Ca, Sr, Zn, Cd and Pb in water to form an aqueous solution containing titanium and metal ions;
    b. adding the solution containing titanium and metal ions to an aqueous alkaline solution containing hydrogen peroxide to form a precipitate while maintaining a constant pH therein;
    c. recovering the precipitate from the resulting mixture; and
    d. heating the precipitate at a temperature not lower than 100° C.

2. The process according to claim 1, wherein hydrogen peroxide is added to the solution containing titanium and metal ions before adding the latter to the alkaline solution containing hydrogen peroxide.

3. The process according to claim 1, wherein an aqueous alkaline solution is added simultaneously with the solution containing titanium and metal ions to the alkaline solution containing hydrogen peroxide to keep the pH value thereof constant.

4. A process for the preparation of a titanate which comprises the steps of
    a. dissolving a titanium salt and at least one metal salt selected from the group consisting of salts of Ba, Ca, Sr, Zn and Cd in water to form an aqueous solution containing titanium and metal ions;
    b. adding the solution containing titanium and metal ions to an aqueous alkaline solution containing hydrogen peroxide to form a precipitate, said hydrogen peroxide being present in an amount of not less than 5 mols to 1 mol of the combined amount of titanium and said metal, the pH value of the resulting mixture being maintained at a constant value of not less than 7;
    c. recovering the precipitate from the resulting mixture; and
    d. heating the precipitate at a temperature of from 100° C to 600° C, the molar ratio of metal to titanium in the resulting titanate being equivalent to the molar ratio of metal to titanium in said solution containing titanium and metal ions.

5. The process according to claim 4, wherein hydrogen peroxide is added to the solution containing titanium and metal ions before adding the latter to the alkaline solution containing hydrogen peroxide.

6. The process according to claim 4, wherein an aqueous alkaline solution is added simultaneously with the solution containing titanium and metal ions to the alkaline solution containing hydrogen peroxide to keep the pH value thereof constant.

7. The process according to claim 4, wherein an aqueous solution containing ions of at least one modifying agent selected from the group consisting of Al, Sn, Y, Zr, Sb, Nb, Ta, Mn, Fe and rare earth elements of atomic numbers 57 to 71 is added to the solution containing titanium and metal ions.

8. A process for the preparation of lead titanate which comprises the steps of
    a. dissolving a titanium salt and a lead salt in water to form an aqueous solution containing titanium and lead ions;
    b. adding the solution containing titanium and lead ions to an aqueous alkaline solution containing hydrogen peroxide to form a precipitate, said hydrogen peroxide being present in an amount of not less than 1 mol to 1 mol of titanium, the pH value of the resulting mixture being maintained at a constant value of not less than 3;
    c. recovering the precipitate from the resulting mixture; and
    d. heating the precipitate at a temperature of from 100° C to 600° C, the molar ratio of lead to titanium in the resulting lead titanate being equivalent to the molar ratio of lead to titanium in said aqueous solution containing titanium and lead ions.

9. The process according to claim 8, wherein an aqueous alkaline solution is added simultaneously with the solution containing titanium and lead ions to the alkaline solution containing hydrogen peroxide to keep the pH value thereof constant.

10. A process according to claim 8, wherein an aqueous solution containing ions of at least one modifying agent selected from the group consisting of Al, Sn, Y, Zr, Sb, Nb, Ta, Mn, Fe and rare earth elements of atomic numbers 57 to 71 is added to the solution containing titanium and lead ions.

* * * * *